United States Patent
Xu et al.

(10) Patent No.: US 11,935,049 B2
(45) Date of Patent: Mar. 19, 2024

(54) GRAPH DATA PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventors: Jie Xu, Shenzhen (CN); Xiaosen Li, Shenzhen (CN); Wen Ouyang, Shenzhen (CN); Pin Xiao, Shenzhen (CN); Yangyu Tao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 59 days.

(21) Appl. No.: 17/949,030

(22) Filed: Sep. 20, 2022

(65) Prior Publication Data
US 2023/0013392 A1    Jan. 19, 2023

Related U.S. Application Data

(63) Continuation of application No. PCT/CN2021/123265, filed on Oct. 12, 2021.

(30) Foreign Application Priority Data

Dec. 3, 2020 (CN) .......................... 202011394355.5

(51) Int. Cl.
*G06F 16/00* (2019.01)
*G06F 16/901* (2019.01)
*G06Q 20/38* (2012.01)

(52) U.S. Cl.
CPC ....... *G06Q 20/389* (2013.01); *G06F 16/9024* (2019.01)

(58) Field of Classification Search
CPC ................................................... G06F 16/9024
See application file for complete search history.

(56) References Cited

U.S. PATENT DOCUMENTS

| | | | |
|---|---|---|---|
| 9,195,941 B2 | 11/2015 | Mojsilovic et al. | |
| 2014/0372447 A1 | 12/2014 | Cheong | |
| 2020/0349324 A1* | 11/2020 | Ostby | ................... G06T 15/005 |

FOREIGN PATENT DOCUMENTS

| | | |
|---|---|---|
| CN | 106844500 A | 6/2017 |
| CN | 107203619 A | 9/2017 |

(Continued)

OTHER PUBLICATIONS

Rong Zhu et al., "Mining Top-K Dense Subgraphs from Uncertain Graphs", Chinese Journal of Computers, vol. 39, No. 8, Aug. 31, 2016, 5 pgs.

(Continued)

*Primary Examiner* — Ajith Jacob
(74) *Attorney, Agent, or Firm* — Morgan, Lewis & Bockius LLP

(57) ABSTRACT

Provided is a graph data processing method, including: acquiring a degree of association of each node in a network graph; splitting the network graph to obtain a dense subgraph according to the degree of association of each node; determining stable nodes in the network graph and coreness of the stable nodes based on the dense subgraph, the coreness of the stable nodes being greater than a preset threshold; obtaining a sparse subgraph in the network graph according to the preset threshold, and remaining nodes in the network graph other than the stable nodes and connecting edges between the remaining nodes; and determining the coreness of each node in the sparse subgraph based on the sparse subgraph and the stable nodes.

20 Claims, 6 Drawing Sheets

(56) References Cited

FOREIGN PATENT DOCUMENTS

| CN | 109921939 A | 6/2019 |
|---|---|---|
| CN | 109978705 A | 7/2019 |
| CN | 111177479 A | 5/2020 |
| CN | 111339374 A | 6/2020 |
| CN | 111368147 A | 7/2020 |
| CN | 111444394 A | 7/2020 |
| CN | 111444395 A | 7/2020 |
| CN | 111475680 A | 7/2020 |
| CN | 112214499 A | 1/2021 |

OTHER PUBLICATIONS

Tencent Technology, ISR, PCT/CN2021/123265, Dec. 28, 2021, 3 pgs.
Tencent Technology, WO, PCT/CN2021/123265, Dec. 28, 2021, 5 pgs.
Tencent Technology, IPRP, PCT/CN2021/123265, May 30, 2023, 6 pgs.
Fragkiskos D. Malliaros et al., "The Core Decomposition of Networks: Theory, Algorithms and Applications", The VLDB Journal, Springer Verlag, vol. 29, No. 1, DOI: 10.1007/S00778-019-00587-4, Nov. 4, 2019, 32 pgs.
Priya Govindan et al., "The K-peak Decomposition: Mapping the Global Structure of Graphs", Proceedings of the 26th International Conference on World Wide Web, DOI: 10.1145/3038912.3052635, Apr. 3, 2017, 10 pgs.
Tencent Technology, Extended European Search Report and Supplementary Search Report, EP Patent Application No. 21899723.7, dated Jan. 5, 2024, 9 pgs.

\* cited by examiner

Initial graph     Step 1     Step 2     Complete

GRAPH DATA PROCESSING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/123265, entitled "GRAPH DATA PROCESSING METHOD AND APPARATUS COMPUTER DEVICE AND STORAGE MEDIUM" filed on Oct. 12, 2021, which claims priority to Chinese Patent Application No. 202011394355.5, filed with the State Intellectual Property Office of the People's Republic of China on Dec. 3, 2020, and entitled "GRAPH DATA PROCESSING METHOD AND APPARATUS, COMPUTER DEVICE, AND STORAGE MEDIUM", all of which are incorporated herein by reference in their entirety.

FIELD OF THE TECHNOLOGY

This application relates to the field of big data technologies, and in particular, to a graph data processing method and apparatus, a computer device, and a storage medium.

BACKGROUND OF THE DISCLOSURE

With the continuous improvement and popularization of Internet technology, more and more users have joined a variety of network platforms, thus forming a large-scale network. It is of great research value to analyze and mine the information hidden in these large-scale networks.

K-Core algorithm is a subgraph mining algorithm, through which closely related subgraphs can be mined from a complex network. For example, groups having abnormal behavior among buyers or sellers can be mined from a transaction network, and buyers or sellers that are at the core of the entire transaction network can also be found.

The current K-core mining algorithm mainly uses a recursive pruning method, that is, starting from k=1, iteratively determines the coreness of each node in each network. However, this recursive pruning method mines upward in a manner with a core value of 1, 2, . . . , k, consuming more iteration time and computing resources on non-critical nodes, resulting in excessively long overall computation time and poor mining performance on ultra-large-scale networks.

SUMMARY

Provided is a graph data processing method, executed by a computer device, the method including:
  acquiring a degree of association of each node in a network graph;
  splitting the network graph to obtain a dense subgraph according to a preset threshold and the degree of association of each node;
  determining stable nodes in the network graph and coreness of the stable nodes based on the dense subgraph, the coreness of the stable nodes being greater than the preset threshold;
  obtaining a sparse subgraph in the network graph according to remaining nodes in the network graph other than the stable nodes and connecting edges between the remaining nodes; and
  determining the coreness of each node in the sparse subgraph based on the sparse subgraph and the stable nodes;
  the determined coreness being used for generating a feature vector corresponding to a corresponding node.

Provided is a graph data processing apparatus, including:
  a network graph acquiring module, configured to acquire a degree of association of each node in a network graph;
  a dense subgraph acquiring module, configured to split the network graph to obtain a dense subgraph according to a preset threshold and the degree of association of each node;
  a first determining module, configured to determine stable nodes in the network graph and coreness of the stable nodes based on the dense subgraph, the coreness of the stable nodes being greater than the preset threshold;
  a sparse subgraph acquiring module, configured to obtain a sparse subgraph in the network graph according to remaining nodes in the network graph other than the stable nodes and connecting edges between the remaining nodes; and
  a second determining module, configured to determine the coreness of each node in the sparse subgraph based on the sparse subgraph and the stable nodes;
  the determined coreness being used for generating a feature vector corresponding to a corresponding node.

Provided is a computer device, including a memory and one or more processors, the memory storing computer-readable instructions that, when executed by the one or more processors, cause the computer device to perform the operations of the foregoing graph data processing method.

Provided is one or more non-transitory computer-readable storage media storing computer-readable instructions that, when executed by one or more processors of a computer device, cause the computer device to perform the operations of the foregoing graph data processing method.

Provided is a computer program, the computer program including computer instructions, the computer instructions being stored in a computer-readable storage medium, a processor of a computer device reading the computer instructions from the computer-readable storage medium, and the processor executing the computer instructions to cause the computer device to perform the operations of the foregoing graph data processing method.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

Figure 1:
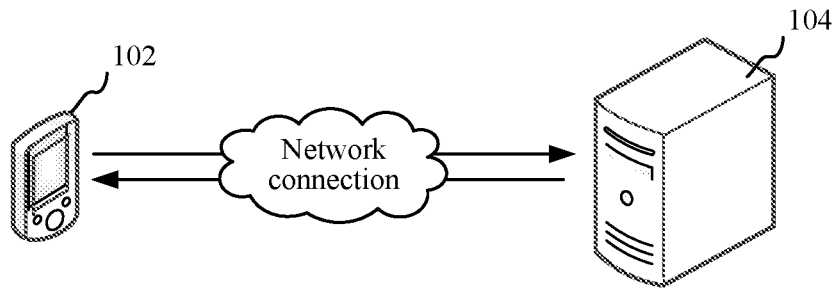
FIG. 1 is a diagram of an application environment of a graph data processing method according to an embodiment.

The graph data processing method provided in this application may be applied to an application environment shown in FIG. 1. A terminal 102 communicates with a server 104 through a network. The interaction between the terminal 102 and the terminal 102 is through a server, and the server 104 can acquire the interaction data formed when the terminal 102 interacts on the network, and generate a network graph according to the interaction data. In an embodiment, the server 104 acquires a degree of association of each node in a network graph; splits the network graph to obtain a dense subgraph according to a preset threshold and the degree of association of each node; determines stable nodes in the network graph and coreness of the stable nodes based on the dense subgraph, the coreness of the stable nodes being greater than the preset threshold; obtains a sparse subgraph in the network graph according to remaining nodes in the network graph other than the stable nodes and connecting edges between the remaining nodes; and determines the coreness of each node in the sparse subgraph based on the sparse subgraph and the stable nodes.

The terminal 102 may be, but not limited to, a personal computer, a smartphone, a tablet computer, a notebook computer, a desktop computer, a smart speaker, a smartwatch, or the like, but this application is not limited thereto. The server 104 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal 102 and the server 104 may be directly or indirectly connected in a wired or wireless communication manner. This is not limited in this application.

An embodiment of this application provides a graph data processing method. The executive body of the graph data processing method may be a graph data processing apparatus provided in an embodiment of this application, or a computer device integrated with the graph data processing apparatus. The graph data processing apparatus may be implemented in a hardware or software manner. The computer device may be the foregoing terminal 102 or the server 104.

In the graph data processing method provided in the embodiment of this application, after obtaining the coreness of each node in the network graph, the coreness of the node can also be used for generating a feature vector corresponding to the node according to the coreness, and the feature vector is used for classifying the node according to the feature vector. For example, the feature vector can be used as input to a machine learning (ML) algorithm to implement classification of the node.

Figure 2:
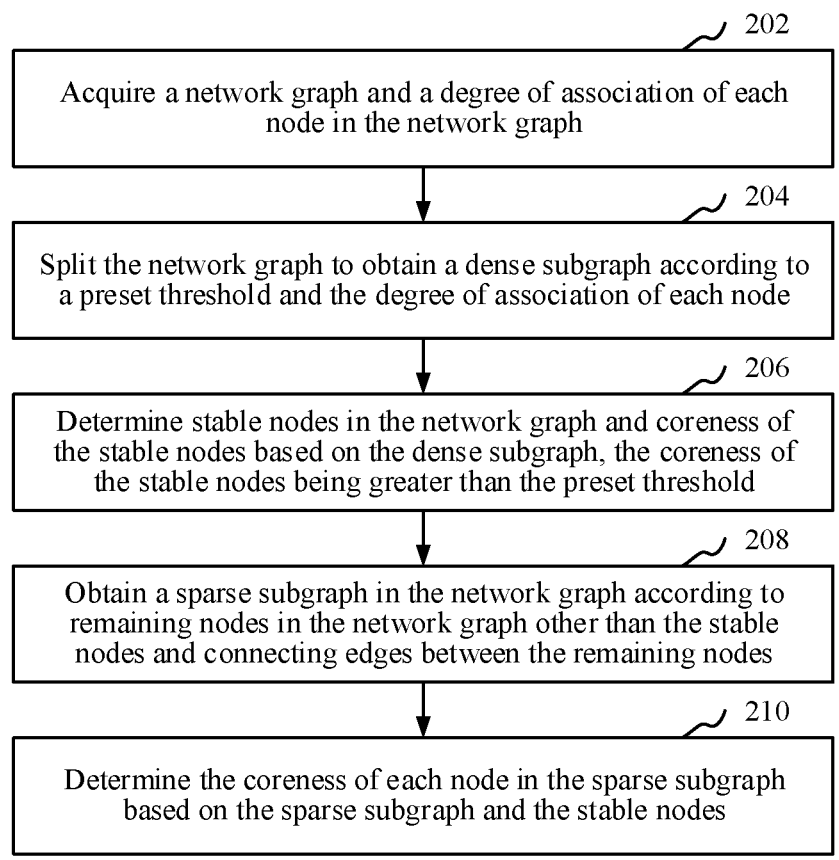
FIG. 2 is a schematic flowchart of a graph data processing method according to an embodiment.

In an embodiment, as shown in FIG. 2, a graph data processing method is provided. An example in which the method is applied to the computer device (terminal 102 or server 104) in FIG. 1 is used for description, and the method includes the following steps:

Step 202: Acquire a degree of association of each node in a network graph.

A graph is a data structure for modeling connections between things. The graph includes a series of nodes and connecting edges for connecting the nodes. The nodes can be referred to as vertices. There is a connecting edge between two nodes, indicating that there is an association between the two nodes. The connecting edge between the two nodes may have a weight. The degree of association of a node refers to the number of edges connected to the node, and is also the number of neighbor nodes adjacent to the node. The neighbor nodes refer to nodes that have connecting edges with the node.

The network graph is a graph generated according to Internet-based network interaction data. The network interaction data may, for example, be payment interaction data, instant messaging interaction data, online shopping interaction data, etc., and the corresponding network graph may, for example, be a payment relationship network graph, instant messaging relationship network graph, and online shopping relationship network graph, etc.

Specifically, in order to realize the mining of useful information in a complex network, the computer device can generate a network graph based on a large amount of interaction data in the network, and acquire the degree of association of each node in the network graph, so as to realize graph mining of the network graph according to the network graph and the degree of association of each node therein. Graph mining refers to a process of mining potentially useful information from a graph by using some algorithms, and includes graph classification, graph distance, subgraph mining, and so on. In the embodiment of this application, the coreness of each node in the network graph is mainly mined, and after the coreness of each node is obtained, not only can a set of nodes that meet the specified coreness be found from the network graph, but also corresponding feature vectors can be generated according to the coreness of each node as input of other machine learning algorithms.

In an embodiment, the network graph may be a payment relationship network graph, and the steps of generating the payment relationship network graph include: acquiring payment records corresponding to user IDs; obtaining payment interaction data between the user IDs according to the payment records; and generating the payment relationship network graph according to the payment interaction data; Nodes of the payment relationship network graph represent the user IDs, and a connecting edge between two nodes in the payment relationship network graph represents the existence of a payment interaction event between two corresponding user IDs.

The payment interaction event is at least one of transfer, red envelope, borrowing, scan to pay and other transaction events. In this embodiment, a user is a node, and if there is a payment interaction event between two users, a connecting edge is formed between the two users. For example, if user a transfers money to user b, then a connecting edge is formed between user a and user b. It is understandable that when there is a large number of user groups, the number of connecting edges formed among these users is ultra large, and thus, the generated payment network relationship graph is ultra large. For example, in a WeChat payment scenario, the number of nodes can reach 2 billion, and the number of connecting edges formed among the 2 billion nodes can reach an ultra large scale of 100 billion.

In an embodiment, the network graph may be a social relationship network graph, and the steps of generating the social relationship network graph include: acquiring historical session data of user IDs; and generating the social relationship network graph according to the historical session data. Nodes of the social relationship network graph represent the user IDs, and a connecting edge between two nodes in the social relationship network graph represents the existence of a historical session between two corresponding user IDs.

In this embodiment, a user is a node. If there is a historical session between two users, a connecting edge is formed between the two users. In another embodiment, if the two users have added a friend relationship to each other, a connecting edge is formed between the two users. Similarly, when the number of users is large, the social relationship network graph formed is also very complex.

In an embodiment, the acquiring a degree of association of each node in a network graph includes: acquiring the network graph; determining the number of neighbor nodes of each node in the network graph; and taking the number of the neighbor nodes as the degree of association of a corresponding node.

The graph may be represented by an adjacency matrix or an adjacency list. In the adjacency list, for each node in the graph, a list of edges starting from the node is stored. For example, if node A has three edges respectively connected to B, C, and D, there are three edges in the list of node A. In the adjacency list, both rows and columns represent nodes, and corresponding elements in the matrix determined by two nodes represent whether the two nodes are connected. If the two nodes are connected, the values of the corresponding elements may represent the weight of the connecting edge between the two nodes.

The computer device can acquire the adjacency list or the adjacency matrix corresponding to the network graph, and traverse the number of neighbor nodes of each node in the network graph from the adjacency list or the adjacency matrix. The number of the neighbor nodes may be taken as the degree of association of the corresponding node.

In a payment scenario, the degree of association of a node in the payment relationship network graph is understandable as the number of nodes with which the node has transaction behavior. In a social scenario, the degree of association of a node in a social relationship network graph is understandable as the number of nodes with which the node has historical sessions.

Step 204: Split the network graph to obtain a dense subgraph according to a preset threshold and the degree of association of each node.

In this embodiment, the coreness of each node in the network graph is mainly mined. Coreness is one of indicators used for determining the importance of nodes in the entire network graph. A k-core subgraph of a graph refers to the remaining subgraph after repeatedly removing nodes with degrees of association less than or equal to k from the graph, that is, removing all vertices in a graph G with degrees of association less than k to obtain a subgraph G'; and removing all vertices in the graph G' with degrees of association less than k to obtain a new subgraph G'', . . . , and so on, and stopping removal until the degree of association of each node in the remaining subgraph is greater than k, to obtain the k-core subgraph of the graph G. The coreness of a node is defined as a maximum-core subgraph where the node is located, that is, if a node is present in an M-core subgraph and is removed in an (M+1)-core graph, the coreness of the node is M.

Figure 3:
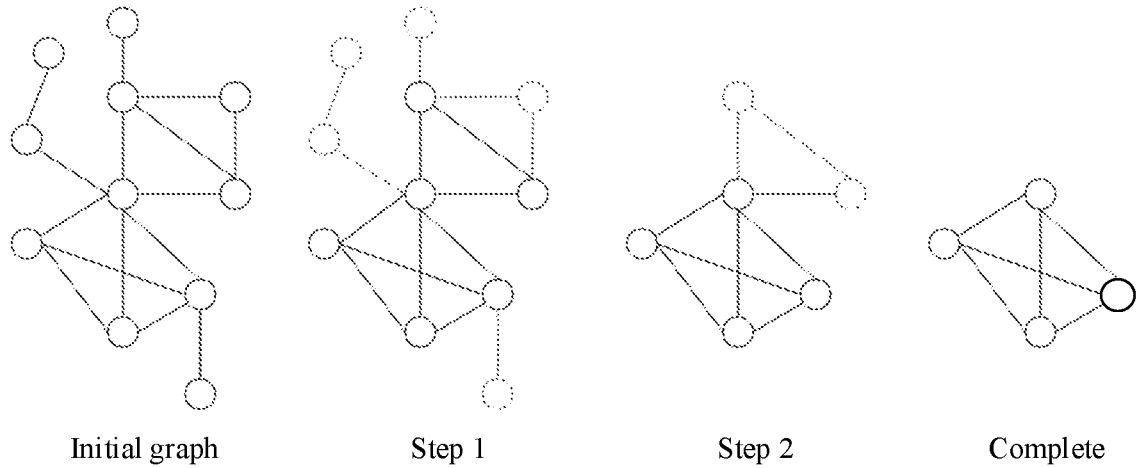
FIG. 3 is a schematic diagram of dividing a network graph into 3-core subgraphs according to an embodiment.

For example, a 2-core subgraph is obtained by first removing all nodes with degrees of association less than 2 from the graph, and then removing the nodes with degrees of association less than 2 from the remaining graphs, and so on, until no node can be removed, thereby obtaining the 2-core subgraph. A 3-core subgraph is obtained by first removing all nodes with degrees of association less than 3 from the graph, and then removing the nodes with degrees of association less than 3 from the remaining graphs, and so on, until no node can be removed, thereby obtaining the 3-core subgraph of this graph. If a node is at most in a 5-core graph but not in a 6-core graph, the coreness of the node is 5. As shown in FIG. 3, FIG. 3 is a schematic diagram of a 3-core subgraph division process. Referring to FIG. 3, it can be seen that the final 3-core subgraph is obtained by removing nodes with degrees of association less than 3 from the graph twice.

According to the above analysis, a node with coreness greater than k necessarily has a degree of association greater than k. Therefore, in the embodiment of this application, the computer device splits, by setting a threshold, the original network graph into two parts, a dense subgraph and a sparse subgraph, according to the degree of association of each node and the threshold, and then mines the coreness of each node in turn. By splitting a network graph to obtain a dense subgraph through a threshold, it is possible to directly mine the dense subgraph to avoid wasting more iteration time and computing resources on non-critical nodes with coreness less than the threshold, which is very important for coreness mining of ultra-large-scale networks. The degree of association of each node in the dense subgraph is necessarily greater than the threshold, but the nodes in the network graph with degrees of association greater than the threshold are not necessarily present in the dense subgraph.

The preset threshold can be set according to actual needs. Optionally, the preset threshold can be determined according to the needs of a specific service scenario. For example, according to past experience, nodes with coreness greater than 300 play a larger role in the network graph, so the computer device can set the preset threshold to 300. Optionally, the preset threshold can also be determined according to the limitations of the computing resources. Because the smaller the threshold is set, the larger the number of nodes included in the dense subgraph split from the network graph is, the larger the dense subgraph is, and the more computing resources are required. Conversely, the larger the threshold is set, the smaller the dense subgraph split from the network graph is, and the less computing resources are required. Optionally, the threshold can also be set according to the distribution of the degree of association of each node in the network graph. For example, if the degrees of association of most nodes in the network graph are all less than a certain value, the threshold can be set to this value.

In an embodiment, the splitting the network graph to obtain a dense subgraph according to a preset threshold and the degree of association of each node includes: acquiring the preset threshold; and removing from the network graph a node of which the degree of association is less than or equal to the preset threshold and a connecting edge where the node is located, and obtain the dense subgraph according to the remaining nodes in the network graph and the connecting edges between the remaining nodes.

Specifically, according to the preset threshold, when the computer device filters out the nodes with degrees of association less than or equal to the threshold from the original graph, the dense subgraph is obtained, and the degrees of association of all the nodes in the obtained dense subgraph are greater than the threshold. Thus, the larger the threshold is set, the smaller the obtained dense subgraph is, and the less computing resources are required.

Figure 4:
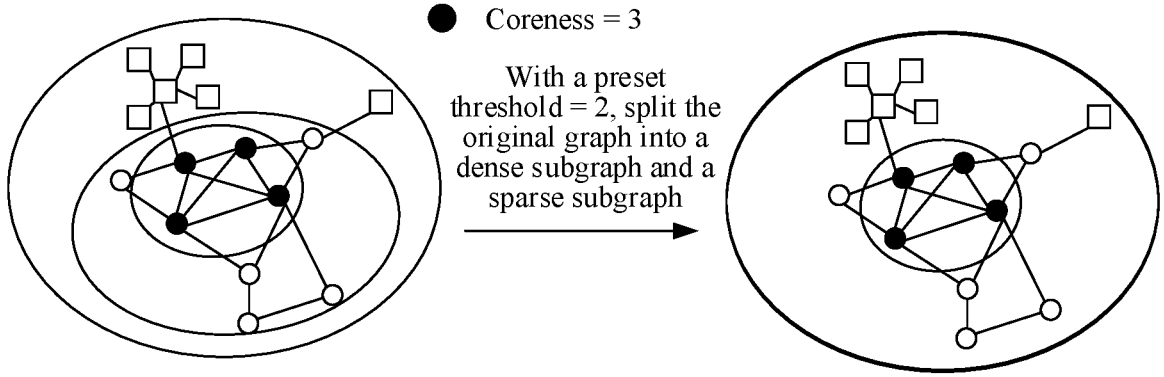
FIG. 4 is a schematic diagram of decomposition of a network graph by k-core and splitting by threshold, respectively, according to an embodiment.

As shown in FIG. 4, FIG. 4 is a schematic diagram of decomposition of a network graph by k-core and splitting by threshold, respectively, according to an embodiment. Referring to the left of FIG. 4, the left is a schematic diagram of mining coreness of each node in a network graph in turn from bottom to top according to a k-core algorithm and according to $k=1, k=2, k=3 \ldots$, that is, starting from $k=1$, repeatedly removing nodes with degrees of association less than or equal to k. For $k=1$, a computer device needs to perform iteration twice; for $k=2$, the computer device needs to perform iteration twice; for $k=3$, the computer device needs to perform iteration twice; and for $k=4$, the computer device needs to perform iteration twice. Because there is no node with a degree of association greater than 5, for $k=5$, the computer device needs to perform iteration once, that is, the computer device needs to perform iteration a total of nine times to determine the coreness of each node in the graph, and to obtain a subgraph composed of nodes of the same coreness. Referring to the right of FIG. 4, the right relates to directly removing nodes with degrees of association less than a preset threshold from the original graph, and splitting the original graph into a dense subgraph and a sparse subgraph with a threshold of 2. For example, the computer device iteratively filters out nodes with degrees of association less than 2 and nodes with degrees of association equal to 2, and only needs to perform iteration twice in total to determine the dense subgraph and the sparse subgraph from the original network graph. Due to the sparsity of iterative calculation, the coreness of lots of nodes in the subsequent iteration process is no longer updated after being determined.

Step 206: Determine stable nodes in the network graph and coreness of the stable nodes based on the dense subgraph, the coreness of the stable nodes being greater than the preset threshold.

The stable nodes are nodes of which the coreness mined from the dense subgraph is greater than the preset threshold. After splitting the network graph to obtain the dense subgraph, the computer device first nines the dense subgraph to determine the stable nodes therein and the coreness of the stable nodes, so as to realize the first step of divide-and-conquer solving.

Specifically, since the degree of association of each node in the sparse subgraph is less than the preset threshold, each node in the sparse subgraph does not affect the coreness of each node in the dense subgraph. Then, the computer device can directly cut into the dense subgraph, mine the dense subgraph, determine the coreness of each node according to the degree of association of each node in the dense subgraph, and take nodes of which the coreness is greater than the preset threshold as the stable node in the network graph.

In an embodiment, the computer device can use a k-core algorithm to directly perform k-core mining on the dense subgraph to mine the stable nodes with coreness greater than the preset threshold from the dense subgraph. Specifically, according to $k=1, k=2, \ldots$, k is equal to the preset threshold, nodes with degrees of association less than or equal to k are repeatedly removed from the dense subgraph to obtain a k-core subgraph, thereby determining a subgraph with maximum coreness where each node in the dense subgraph is located, and thus determining the coreness of each node. The nodes of which the coreness is greater than the preset threshold are taken as the stable nodes.

In an embodiment, when iterating a dense subgraph, the computer device can use, in the current iteration process, a core index of each neighbor node of the node after the previous iteration to update the coreness of a corresponding node in the current iteration process. Moreover, since one node does not affect the calculation of the coreness of other nodes with greater coreness than the node, after updating the coreness of each node in the current iteration, the computer device may also continue to participate in the next iteration of nodes of which the updated coreness is greater than the preset threshold. The nodes of which the updated coreness is less than or equal to the preset threshold no longer participate in the next iteration, so that nodes in the dense subgraph with coreness greater than the preset threshold can be mined.

In an embodiment, core indexes of all neighbor nodes of a node may be an H index, and if the H index of a node is h, it means that this node has at least h neighbor nodes, and the degrees of association of the h neighbor nodes are all not less than h. That is, when the node satisfies that the current coreness of h neighbor nodes in the neighbor nodes is greater than or equal to h, and does not satisfy that the current coreness of h+1 neighbor nodes is greater than or equal to h+1, it is determined that the core index corresponding to the node is h, where h is a positive integer.

Figure 5:
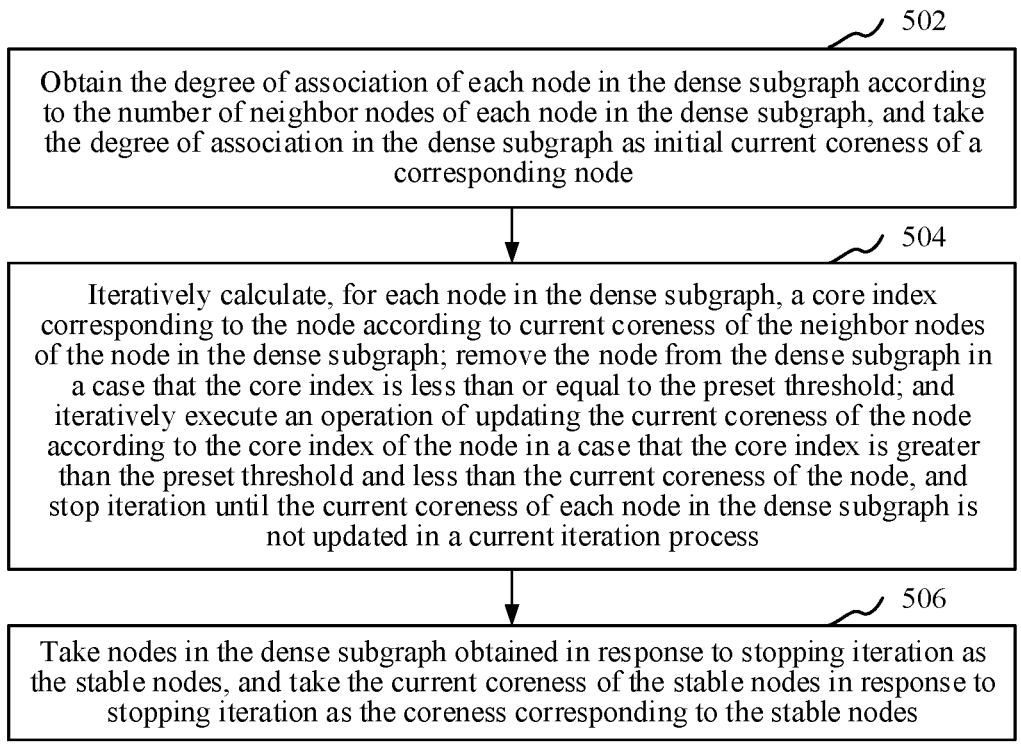
FIG. 5 is a schematic flowchart of determining stable nodes in a network graph according to a dense subgraph according to an embodiment.

In an embodiment, as shown in FIG. 5, the determining stable nodes in the network graph and coreness of the stable nodes based on the dense subgraph includes:

Step 502: Obtain the degree of association of each node in the dense subgraph according to the number of neighbor nodes of each node in the dense subgraph, and take the degree of association in the dense subgraph as initial current coreness of the corresponding node.

Specifically, when mining the dense subgraph, the computer device uses the degree of association, in the dense subgraph, of each node in the dense subgraph to initialize the coreness of each node as the initial current coreness.

It is understandable that the "current coreness" in this embodiment changes dynamically, and refers to the coreness updated by each node after the previous iteration. The "previous iteration process" and the "current iteration process" also change dynamically. In the next iteration, the "current iteration process" becomes the "previous iteration process", and the next iteration becomes the "current iteration process".

Step 504: Iteratively calculate, for each node in the dense subgraph, a core index corresponding to the node according to current coreness of the neighbor nodes of the node in the dense subgraph; remove the node from the dense subgraph when the core index is less than or equal to the preset threshold; and iteratively execute an operation of updating the current coreness of the node according to the core index of the node when the core index is greater than the preset threshold and less than the current coreness of the node, and stop iteration until the current coreness of each node in the dense subgraph is not updated in a current iteration process.

Specifically, in each iteration process, the computer device needs to process each node in the dense subgraph. For each node in the dense subgraph, the core index corresponding to the node is calculated according to the current coreness of the neighbor nodes thereof, i.e., the coreness of all the neighbor nodes after the previous iteration process. If the core index of the node is less than or equal to the preset threshold, the node does not affect the calculation of the coreness of other nodes with greater coreness than the node, and the node does not need to participate in the subsequent iteration process, thus the node can be removed from the dense subgraph. If the core index of the node is greater than the preset threshold and less than the current coreness of the node, the current coreness of the node is updated using the core index, and the node also needs to continue to participate in subsequent iteration processes. Since the coreness of each node in the current iteration process is determined according to the coreness of all the neighbor nodes of the node in the previous iteration process, this has locality and can easily be extended into distributed parallel computing logic, thereby speeding up the entire mining process.

The iteration stop condition is that the current coreness of all remaining nodes in the dense subgraph has not changed in the current iteration process. That is, when the core index calculated according to the coreness of the neighbor nodes of the node in the previous iteration is consistent with the current coreness of the node, the coreness of the node is not updated. If the current coreness of all the remaining nodes in the dense subgraph is not updated in the current iteration process, the iteration is stopped.

It is understandable that, since the nodes in the dense subgraph of which the core indexes are less than or equal to the preset threshold are removed in each iteration process, the dense subgraph also changes dynamically in the iteration process, and thus the neighbor nodes of each node in the dense subgraph also change constantly. Therefore, calculating the core index of each node according to the current coreness of the neighbor nodes of the node, the core index needs to be calculated according to the current coreness of the neighbor nodes of the node in the current dense subgraph, rather than according to the current coreness of the neighbor nodes of the node in the initial dense subgraph, so that the amount of calculation can further be reduced.

In an embodiment, if the calculated core index of the node is less than or equal to the preset threshold after the current iteration, the computer device can mark the node as unstable, and the node marked as unstable will no longer participate in the next iteration process.

In an embodiment, the above-mentioned method further includes: recording, at the end of the current iteration, the node of which the current coreness is updated in the current iteration process. The recorded node is used for indicating that at the beginning of the next iteration, neighbor nodes of the recorded node in the dense subgraph are taken as target nodes of which the core indexes need to be recalculated in the next iteration process. The calculating, for each node in the dense subgraph, a core index corresponding to the node according to current coreness of the neighbor nodes of the node in the dense subgraph includes: calculating, for the target nodes in the dense subgraph, core indexes corresponding to the target nodes according to current coreness of the neighbor nodes of the target nodes in the dense subgraph.

In this embodiment, by recording the nodes of which the current coreness is updated in the current iteration process, nodes of which the coreness needs to be recalculated in the next iteration process can be directly determined. When the coreness of a certain node is updated, the node may affect the determination of the coreness of neighbor nodes thereof. Therefore, when the current iteration process ends, the nodes of which the coreness is updated are recorded. At the beginning of the next iteration, the neighbor nodes of these nodes are traversed from the remaining nodes in the dense subgraph, as the nodes of which the coreness needs to be recalculated in the next iteration process. Thus, recalculation of the coreness of all the nodes in the dense subgraph can be avoided, and the mining efficiency can be improved. It is understandable that, the neighbor nodes of the nodes of which the current coreness has been updated do not include nodes that have been removed from the dense subgraph.

In an embodiment, the above-mentioned method further includes: initializing, at the beginning of the current iteration process, the number of node updates to zero, the number of node updates being used for recording the number of nodes of which the current coreness is updated in the current iteration process; counting the number of nodes of which the current coreness is updated in the current iteration process; updating the number of node updates according to the number; continuing the next iteration process when the number of node updates is non-zero at the end of the current iteration process; and stopping iteration when the number of node updates is zero at the end of the current iteration process.

In this embodiment, in the process of mining the dense subgraph, a marker can be employed to record the number of the nodes of which the current coreness is updated in the current iteration process. The computer device can set a marker for recording the number of nodes of which the current coreness is updated in each iteration process. When the current iteration process starts, this marker is set to 0. For each node participating in the current iteration, whenever the coreness of a node is updated, the marker is increased by 1. After the current iteration ends, if the marker is not 0, it means that there is a node of which the coreness is updated in the current iteration process, and it is necessary to continue the iteration. If the marker is 0, it means that there is no node of which the coreness is updated in the whole process of the current iteration, and the whole iteration process ends.

Step 506: Take nodes in the dense subgraph obtained in response to stopping iteration as the stable nodes, and take the current coreness of the stable nodes in response to stopping iteration as the coreness corresponding to the stable nodes.

Since the coreness of the remaining nodes in the dense subgraphs after the end of the iteration is greater than the preset threshold, these nodes can be called stable nodes. The coreness of the stable nodes is the coreness of the node in the entire original network graph.

In a specific embodiment, the process of determining the coreness of each node in the dense subgraph is as follows:
1. Calculate the degree of association of each node in the dense subgraph according to the number of neighbor nodes, in the dense subgraph, of each node in the dense subgraph, and use the degree of association to initialize the current coreness of each node.
2. Initialize numMsgs with zero, where numMsgs represents the number of nodes of which the coreness is updated in each iteration.

3. For each node in the dense subgraph, calculate the core index according to the current coreness of the neighbor nodes thereof, the neighbor nodes of the node being the nodes in the dense subgraph that have filtered out the nonActive state. When the core index is less than or equal to the preset threshold, the node is marked as nonActive state. When the core index is greater than the preset threshold and less than the current coreness of the node, the current coreness of the node is updated according to the core index, and numMsgs is increased by 1.

4. When numMsgs is not 0, repeat steps 2 and 3; otherwise, end the iteration. In this case, the current coreness of a node of which the state is not marked as nonActive in the dense subgraph is the coreness of the node in the entire original network graph, and nodes that are not marked as nonActive are the stable node in the network graph.

In this embodiment, the coreness of each node in the dense subgraph is calculated based on the core index, and the coreness obtained by each iterative calculation is compared with the preset threshold. Only when the coreness in the iterative calculation is greater than the preset threshold, the iteration of the node continues. Otherwise, the node no longer participates in the subsequent iteration, so that the mining efficiency of the dense subgraph can be improved.

Step 208: Obtain a sparse subgraph in the network graph according to remaining nodes in the network graph other than the stable nodes and connecting edges between the remaining nodes.

Specifically, after the computer device determines the stable nodes in the network graph, the coreness of the remaining nodes in the network graph other than the stable nodes is less than or equal to the preset threshold, and these remaining nodes and the connecting edges formed therebetween are called the sparse subgraph.

In an embodiment, the obtaining a sparse subgraph in the network graph according to remaining nodes in the network graph other than the stable nodes and connecting edges between the remaining nodes includes: removing the stable nodes from the network graph; and obtaining the sparse subgraph according to the remaining nodes after removing the stable nodes and the connecting edges between the remaining nodes.

As mentioned earlier, the graph can be stored in the form of an adjacency matrix or an adjacency list. After determining the stable nodes in the network graph, the computer device can the adjacency matrix or the adjacency list, and obtain the remaining nodes and the connection relationship between the remaining nodes after removing the stable nodes therefrom, thereby obtaining the sparse subgraph.

Step 210: Determine the coreness of each node in the sparse subgraph based on the sparse subgraph and the stable nodes.

The calculation of the coreness of each node in the sparse subgraph also follows the above-mentioned core index iteration method. However, since the stable nodes affect the calculation of the coreness of each node in the sparse subgraph, in the iteration process, it is also necessary to consider the increase of the coreness of the nodes in the sparse subgraph by the stable nodes. After obtaining the sparse subgraph and the stable nodes in the network graph, the computer device can determine the coreness of each node in the sparse subgraph based on the sparse subgraph and the stable nodes, so as to realize the second step of the divide-and-conquer solving.

In an embodiment, the computer device can use a k-core algorithm to perform k-core mining on the sparse subgraph to mine the coreness of each node from the sparse subgraph. Specifically, according to k=1, k=2, . . . , k is equal to the preset threshold, nodes with degrees of association less than or equal to k are repeatedly removed from the sparse subgraph to obtain a k-core subgraph, thereby determining a subgraph with maximum coreness where each node in the sparse subgraph is located, and thus determining the coreness of each node.

In an embodiment, when iterating a sparse subgraph, the computer device can further use, in the current iteration process, a core index of each neighbor node of the node in the network graph after the previous iteration of the node to update the coreness of a corresponding node in the current iteration process.

In an embodiment, core indexes of all neighbor nodes of a node may be an H index, and if the H index of a node is h, it means that this node has at least h neighbor nodes, and the degrees of association of the h neighbor nodes are all not less than h. That is, when the node satisfies that the current coreness of h neighbor nodes in the neighbor nodes is greater than or equal to h, and does not satisfy that the current coreness of h+1 neighbor nodes is greater than or equal to h+1, it is determined that the core index corresponding to the node is h, where h is a positive integer.

Figure 6:
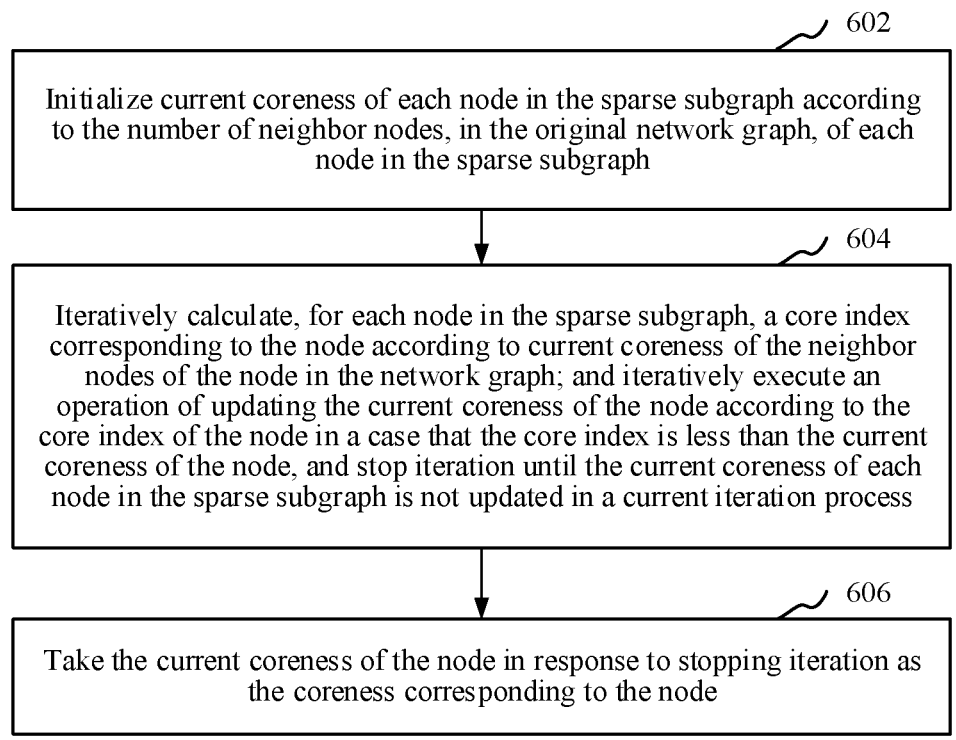
FIG. 6 is a schematic flowchart of determining coreness of nodes in a network graph according to a sparse subgraph according to an embodiment.

In an embodiment, as shown in FIG. 6, the determining the coreness of each node in the sparse subgraph based on the sparse subgraph and the stable nodes includes:

Step 602: Initialize current coreness of each node in the sparse subgraph according to the number of neighbor nodes, in the original network graph, of each node in the sparse subgraph.

Specifically, when mining the sparse subgraph, the computer device can use the degree of association, in the original network graph, of each node in the sparse subgraph to initialize the coreness of each node as initial current coreness.

That is, when calculating the coreness of each node in the sparse subgraph, in each iteration process, not only the influence of the nodes in the sparse subgraph on the coreness of the node, but also the influence of the stable nodes on the coreness of the node needs be considered, so it is necessary to consider the increase of the degree of association of the node by the stable nodes. That is, the current coreness of the node is initialized by summing the degree of association the node in the sparse subgraph and the number of stable nodes to which the node is connected, that is, in fact, the degree of association of the node in the original network graph.

In an embodiment, according to the previous step, the coreness of the stable nodes has been determined, and the coreness of the stable nodes is greater than the preset threshold, while the coreness of each node in the sparse subgraph is less than or equal to the preset threshold. Therefore, when calculating the coreness of each node in the sparse subgraph, if the coreness of the stable nodes needs to be used, in order to reduce the memory, the coreness of the stable nodes can be set to the preset threshold or any value greater than the preset threshold, and can also directly use the coreness of the stable nodes determined according to the previous step. The settings in the different ways described above do not affect the calculation result of the coreness of each node in the sparse subgraph.

Step 604: Iteratively calculate, for each node in the sparse subgraph, a core index corresponding to the node according to current coreness of the neighbor nodes of the node in the network graph. Iteratively execute an operation of updating the current coreness of the node according to the core index of the node when the core index is greater than the preset threshold and less than the current coreness of the node, and stop iteration until the current coreness of each node in the sparse subgraph is not updated in a current iteration process.

Specifically, in each iteration process, the computer device needs to process each node in the sparse subgraph. For each node in the sparse subgraph, a core index corresponding to the node is calculated according to the current coreness of neighbor nodes thereof in the network graph, that is, the coreness of all the neighbor nodes after the previous iteration process. It is understandable that, if the neighbor nodes include stable nodes, the coreness of the stable nodes has been determined in the above-mentioned step, and therefore, in the iteration process of the sparse subgraph, the coreness of the stable nodes does not need to participate in the update. If the core index of the node is less than the current coreness of the node, the current coreness of the node is updated using the core index. Since the coreness of each node in the current iteration process is determined according to the coreness of all the neighbor nodes of the node in the previous iteration process, it has locality and can easily be extended into distributed parallel computing logic, thereby speeding up the entire mining process.

The iteration stop condition is that the current coreness of all the nodes in the sparse subgraph has not changed in the current iteration process. That is, when the core index calculated according to the coreness of the neighbor nodes of the node in the previous iteration is consistent with the current coreness of the node, the coreness of the node is not updated. If the current coreness of all the nodes in the sparse subgraph is not updated in the current iteration process, the iteration is stopped.

In an embodiment, the above-mentioned method further includes: recording, at the end of the current iteration, the node of which the current coreness is updated in the current iteration process. The recorded node is used for indicating that at the beginning of the next iteration, neighbor nodes of the recorded node in the sparse subgraph are taken as target nodes of which the core indexes need to be recalculated in the next iteration process. The calculating, for each node in the sparse subgraph, a core index corresponding to the node according to current coreness of the neighbor nodes of the node in the network graph includes: calculating, for the target nodes in the sparse subgraph, core indexes corresponding to the target nodes according to current coreness of the neighbor nodes of the target nodes in the network graph.

In this embodiment, by recording the nodes of which the current coreness is updated in the current iteration process, nodes of which the coreness needs to be recalculated in the next iteration process can be directly determined. When the coreness of a certain node is updated, the node may affect the determination of the coreness of neighbor nodes thereof. Therefore, when the current iteration process ends, the nodes of which the coreness is updated are recorded. At the beginning of the next iteration, the neighbor nodes of these nodes are traversed from the sparse subgraph, as the nodes of which the coreness needs to be recalculated in the next iteration process. Thus, recalculation of the coreness of all the nodes in the sparse subgraph can be avoided, and the mining efficiency can be improved. It is understandable that, after determining the neighbor nodes of the nodes of which the current coreness is updated, if the neighbor nodes include stable nodes, the stable nodes do not require recalculation of the coreness thereof.

In an embodiment, the above-mentioned method further includes: initializing, at the beginning of the current iteration process, the number of node updates to zero, the number of node updates being used for recording the number of nodes of which the current coreness is updated in the current iteration process; counting the number of nodes of which the current coreness is updated in the current iteration process; updating the number of node updates according to the number; continuing the next iteration process when the number of node updates is non-zero at the end of the current iteration process; and stopping iteration when the number of node updates is zero at the end of the current iteration process.

In this embodiment, in the process of mining the sparse subgraph, a marker can be employed to record the number of the nodes of which the current coreness is updated in the current iteration process. The computer device can set a marker for recording the number of nodes of which the current coreness is updated in each iteration process. When the current iteration process starts, this marker is set to 0. For each node participating in the current iteration, whenever the coreness of a node is updated, the marker is increased by 1. After the current iteration ends, if the marker is not 0, it means that there is a node of which the coreness is updated in the current iteration process, and it is necessary to continue the iteration. If the marker is 0, it means that there is no node of which the coreness is updated in the whole process of the current iteration, and the whole iteration process ends.

Step 606: Take the current coreness of the node in response to stopping iteration as the coreness corresponding to the node.

At the end of the iteration, the coreness of each node in the sparse subgraph is the coreness of the node in the entire original network graph.

In a specific embodiment, the process of determining the coreness of each node in the sparse subgraph is as follows:
1: Calculate the degree of association of each node in the sparse subgraph.
2. For each node in the sparse subgraph, count the number q of stable nodes to which the node is connected, and initialize the current coreness of the node with the sum of the q value and the degree of association thereof.
3. Initialize numMsgs with zero, where numMsgs represents the number of nodes of which the coreness is updated in each iteration.
4: For each node in the sparse subgraph, calculate the core index according to the current coreness of the neighbor nodes thereof. The neighbor nodes here refer to the neighbor nodes of the node in the original network graph, that is, the neighbor nodes include not only the nodes in the sparse subgraph, but also the stable nodes. When the core index is less than the current coreness of the node, the current coreness of the node is updated according to the core index, and numMsgs is increased by 1.
5. When numMsgs is not 0, repeat steps 3 and 4; otherwise, end the iteration. In this case, the coreness of each node in the sparse subgraph is the coreness of the node in the entire original network graph.

In the above-mentioned graph data processing method, after acquiring the degree of association of each node in the network graph, divide-and-conquer solving is performed on the network graph, so that subgraph mining of ultra-large-scale networks can be supported. That is, according to the degree of association of each node, splitting a complete network graph into a dense subgraph and a sparse subgraph, i.e., splitting it into two parts for mining, greatly reduces the memory consumption, and can directly cut into the dense subgraph, thereby avoiding wasting more iteration time and computing resources on non-critical nodes, and improving the mining performance.

Since each node in the sparse subgraph does not affect the nodes in the dense subgraph, for the dense subgraph, the stable nodes therein and the coreness corresponding to the stable nodes are directly determined, and then the remaining part of the network graph other than the stable nodes and the connecting edges between the stable nodes form the sparse subgraph. Considering that the stable nodes in the dense subgraph affect the nodes in the sparse subgraph, for the sparse subgraph, it is necessary to determine the coreness of each node in the sparse subgraph according to the sparse subgraph itself and the stable nodes in the dense subgraph. After mining the coreness of each node in the network graph, the coreness can be taken as the feature of the corresponding node to generate a corresponding feature vector to be inputted to other downstream tasks.

Parameter Server is an ultra-large-scale parameter server used for distributed storage or update of parameters in the field of machine learning. Angel is a high-performance distributed machine learning platform developed based on the concept of parameter server. Spark is a fast and universal computing engine specially designed for large-scale data processing. Spark on Angel is a high-performance distributed computing platform that combines the powerful parameter server functionality of Angel with the large-scale data processing capability of Spark.

In an embodiment, the computer device may implement the iteration process of the above-mentioned graph data processing method on Spark on Angel.

Specifically, first, the nodes of which the coreness updated during the previous iteration process can be pulled from the parameter server. Since the coreness of a node is determined by the coreness of neighbor nodes thereof, if coreness values of the neighbor nodes change, it affects the coreness of this node. Therefore, the nodes of which the coreness needs to be recalculated in the current iteration can be inferred. Next, the nodes of which the coreness needs to be recalculated and the coreness of the neighbor nodes thereof are pulled from the parameter server. Then, the coreness of these nodes in the current iteration is calculated based on the core index. If the previous coreness needs to be updated with the calculated coreness, the updated coreness needs to be stored in the parameter server for use in the iteration process.

Figure 7:
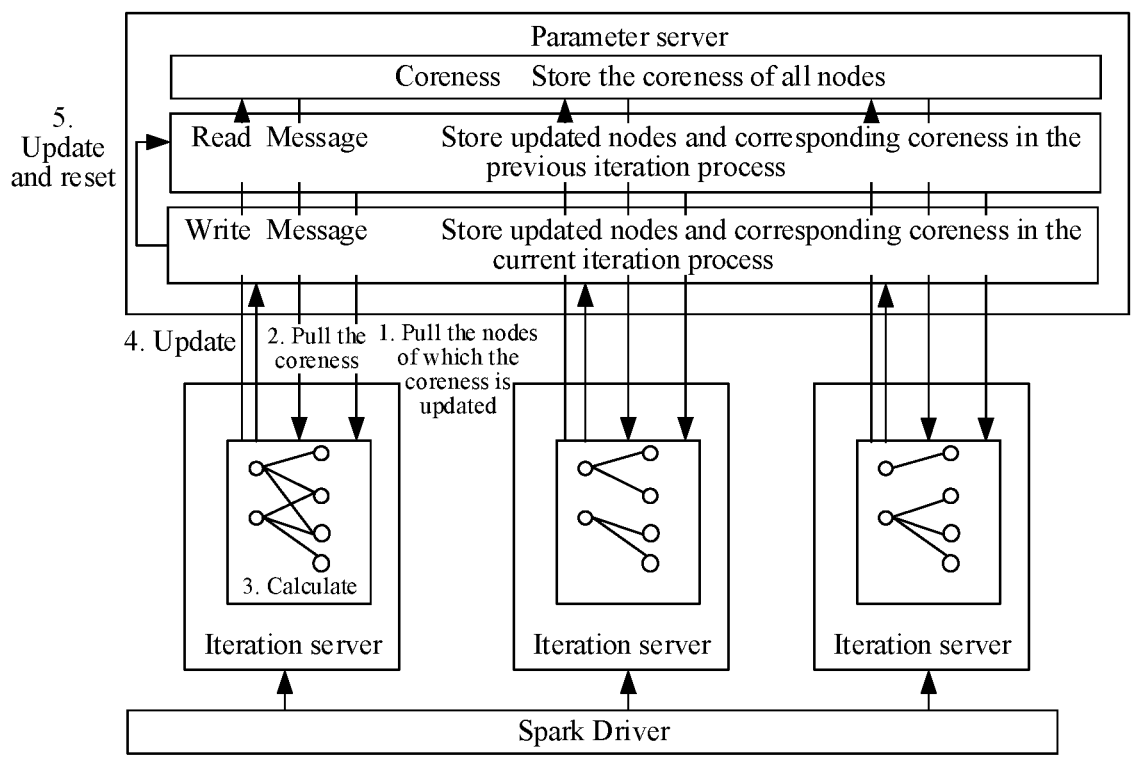
FIG. 7 is a schematic diagram of a graph data processing method according to an embodiment.

As shown in FIG. 7, FIG. 7 is a schematic diagram of a graph data processing method according to an embodiment. Referring to FIG. 7, FIG. 7 shows a flow of implementing the above-described graph data processing method on a Spark on Angel platform. The parameter server stores the current coreness of all nodes, the updated nodes and coreness thereof in each iteration and the previous iteration. The iteration server stores the adjacency list. For each iteration server, each iteration mainly has the following steps:
1. Pull the updated nodes in the previous iteration from ReadMessage of the parameter server, so as to infer the nodes of which the coreness needs to be recalculated in this iteration. The basis here is that: the coreness of a node is determined by the coreness of neighbor nodes thereof, and if the coreness of the neighbor nodes changes, it affects the coreness of this node.
2. Pull the nodes requiring calculation and the coreness of the neighbor nodes thereof from Coreness of the parameter server.
3. Calculate the coreness of the nodes in this iteration.
4. Update the coreness stored in WriteMessage and Coreness of the parameter server with the coreness obtained in step 3.

When all iteration servers have been computed once, ReadMessage is updated with WriteMessage, and WriteMessage is reset. Whether ReadMessage is empty is determined, and if empty, it means that the coreness of all nodes is no longer updated, the iteration is ended; otherwise, the iteration is continued.

In this embodiment, using the efficient data parallel processing capability of the Spark platform for iterative calculation in coreness update can improve data processing efficiency. Using the powerful storage capability of the parameter server of Angel to pull or update the coreness can eliminate the network bottleneck of the single-point Driver in Spark, and can support k-core mining of ultra-large-scale relationship networks. By using the characteristics of the k-core mining itself, as the iteration goes deep, most of the nodes remain stable and are no longer updated. The calculation process has a certain sparsity, and therefore, two-step mining, i.e., setting a threshold and dividing a complete graph structure into a dense subgraph and a sparse subgraph based on a divide-and-conquer idea, greatly reduces memory consumption, decreases the amount of calculation, accelerates the running speed, and consumes less resources. Moreover, it is possible to directly cut into the dense subgraph to avoid wasting more iteration time and computing resources on non-critical nodes with coreness of 1, 2, . . . , which is very important for k-core mining of ultra-large-scale networks.

Figure 8:
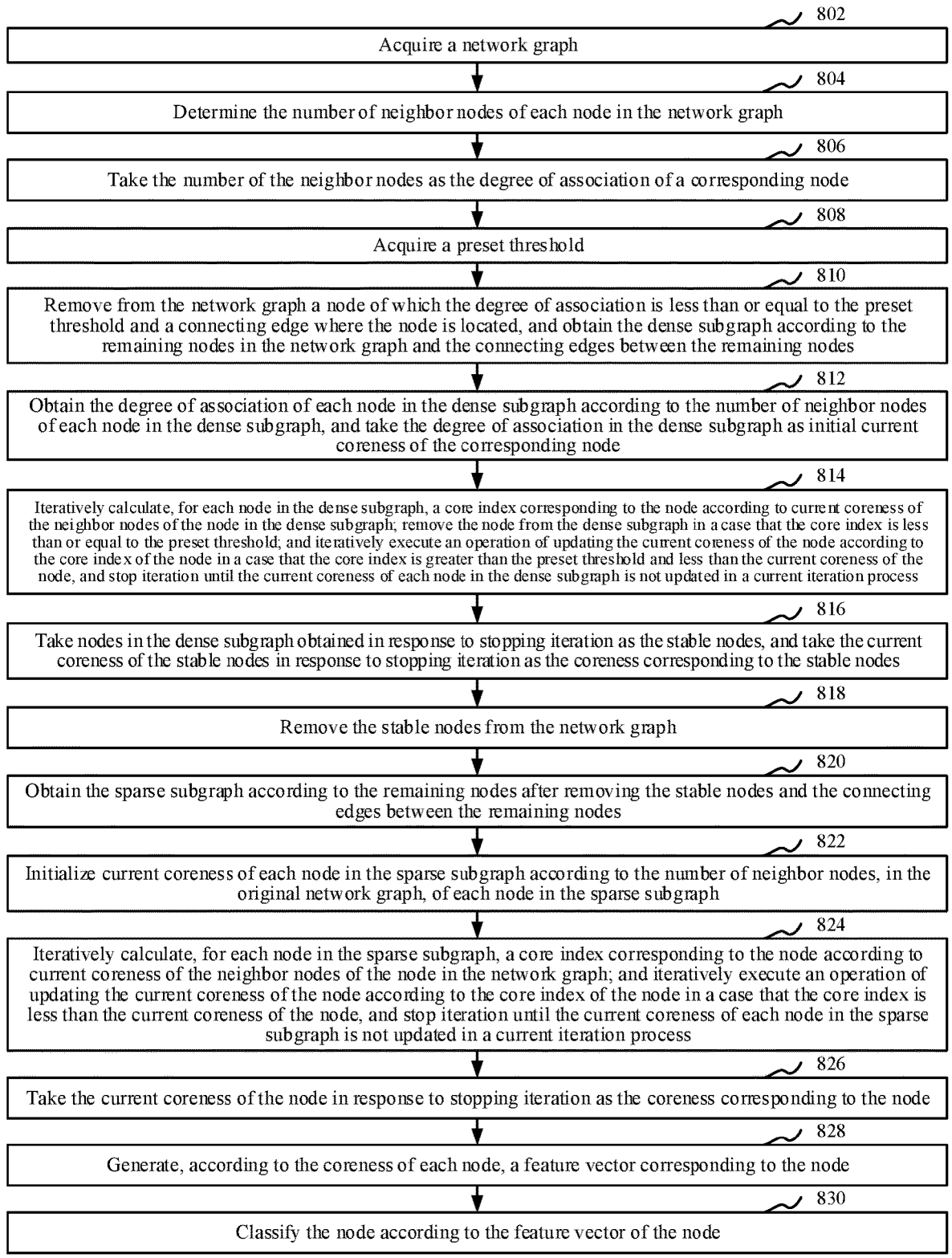
FIG. 8 is a schematic flowchart of a graph data processing method according to a specific embodiment.

In a specific embodiment, as shown in FIG. 8, the above-mentioned graph data processing method includes the following steps:

Step 802: Acquire the network graph.

Step 804: Determine the number of neighbor nodes of each node in the network graph.

Step 806: Take the number of the neighbor nodes as the degree of association of a corresponding node.

Step 808: Acquire the preset threshold.

Step 810: Remove from the network graph a node of which the degree of association is less than or equal to the preset threshold and a connecting edge where the node is located, and obtain the dense subgraph according to the remaining nodes in the network graph and the connecting edges between the remaining nodes.

Step 812: Obtain the degree of association of each node in the dense subgraph according to the number of neighbor nodes of each node in the dense subgraph, and take the degree of association in the dense subgraph as initial current coreness of the corresponding node.

Step 814: Iteratively calculate, for each node in the dense subgraph, a core index corresponding to the node according to current coreness of the neighbor nodes of the node in the dense subgraph; remove the node from the dense subgraph when the core index is less than or equal to the preset threshold; and iteratively execute an operation of updating the current coreness of the node according to the core index of the node when the core index is greater than the preset threshold and less than the current coreness of the node, and stop iteration until the current coreness of each node in the dense subgraph is not updated in a current iteration process.

Step 816: Take nodes in the dense subgraph obtained in response to stopping iteration as the stable nodes, and take the current coreness of the stable nodes in response to stopping iteration as the coreness corresponding to the stable nodes.

Step 818: Remove the stable nodes from the network graph.

Step 820: Obtain the sparse subgraph according to the remaining nodes after removing the stable nodes and the connecting edges between the remaining nodes.

Step 822: Initialize current coreness of each node in the sparse subgraph according to the number of neighbor nodes, in the original network graph, of each node in the sparse subgraph.

Step 824: Iteratively calculate, for each node in the sparse subgraph, a core index corresponding to the node according to current coreness of the neighbor nodes of the node in the network graph. Iteratively execute an operation of updating the current coreness of the node according to the core index of the node when the core index is greater than the preset threshold and less than the current coreness of the node, and stop iteration until the current coreness of each node in the sparse subgraph is not updated in a current iteration process.

Step 826: Take the current coreness of the node in response to stopping iteration as the coreness corresponding to the node.

Step 828: Generate, according to the coreness of each node, a feature vector corresponding to the node.

Step 830: Classify the node according to the feature vector of the node.

In an embodiment, the coreness of nodes can be used for generating feature vectors corresponding to the nodes according to the coreness, and the feature vectors are used for classifying the nodes according to the feature vectors. Specifically, the coreness of nodes can be inputted into a machine learning algorithm as a feature to implement classification of the nodes. For example, the coreness of nodes can be applied to the mining of business models of merchants to classify consumers and merchants in ultra-large-scale payment networks. The coreness of nodes can also be applied to financial risk control products to realize mining of abnormal operations such as illegal credit intermediation, cash-out, multi-platform loan, and gambling.

In an embodiment, the network graph is a payment relationship network graph, nodes in the payment relationship network graph represent user IDs, and a connecting edge between two nodes in the payment relationship network graph represents the existence of a payment interaction event between two corresponding user Ids. The above-mentioned method further includes: generating, according to the coreness of each node in the payment relationship network graph, a feature vector corresponding to a user ID represented by the node; and predicting, by a pre-trained classification model, a payment type corresponding to the user ID based on the feature vector.

In a specific application scenario, the computer device can acquire payment records corresponding to user IDs; obtain payment interaction data between the user IDs according to the payment records; and generate a payment relationship network graph according to payment interaction data, process the payment relationship network graph by using the graph data processing method provided in the embodiment of this application to obtain the coreness of each node, generate a corresponding feature vectors according to the coreness of each node, and classify each node by using a classification algorithm based on machine learning to distinguish whether each node is a merchant or a consumer.

It is to be understood that, although the steps in the flowcharts of FIG. 2, FIG. 5, FIG. 6, and FIG. 8 are sequentially displayed according to indication of arrows, the steps are not necessarily sequentially performed in the sequence indicated by the arrows. Unless clearly specified in this specification, there is no strict sequence limitation on the execution of the steps, and the steps may be performed in another sequence. In addition, at least some steps in the foregoing figures may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Figure 9:
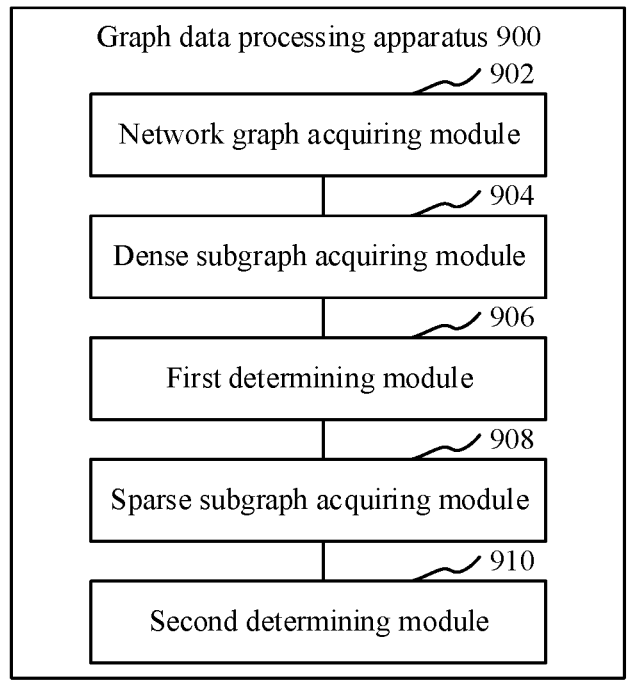
FIG. 9 is a structural block diagram of a graph data processing apparatus according to an embodiment.

In an embodiment, as shown in FIG. 9, a graph data processing apparatus 900 is provided. The apparatus can employ a software module or a hardware module, or a combination of both to become a part of the computer device. The apparatus specifically includes: a network graph acquiring module 902, a dense subgraph acquiring module 904, a first determining module 906, a sparse subgraph acquiring module 908, and a second determining module 910.

The network graph acquiring module 902 is configured to acquire a degree of association of each node in a network graph.

The dense subgraph acquiring module 904 is configured to split the network graph to obtain a dense subgraph according to a preset threshold and the degree of association of each node.

The first determining module 906 is configured to determine stable nodes in the network graph and coreness of the stable nodes based on the dense subgraph. The coreness of the stable nodes is greater than the preset threshold.

The sparse subgraph acquiring module 908 is configured to obtain a sparse subgraph in the network graph according to remaining nodes in the network graph other than the stable nodes and connecting edges between the remaining nodes.

The second determining module 910 is configured to determine the coreness of each node in the sparse subgraph based on the sparse subgraph and the stable nodes. The coreness of the node is used for generating a feature vector corresponding to the node.

In an embodiment, the network graph acquiring module 902 is further configured to: acquire the network graph; determine the number of neighbor nodes of each node in the network graph; and take the number of the neighbor nodes as the degree of association of a corresponding node.

In an embodiment, the network graph acquiring module 902 is further configured to: acquire payment records corresponding to user IDs; obtain payment interaction data between the user IDs according to the payment records; and generate the payment relationship network graph according to the payment interaction data. Nodes of the payment relationship network graph represent the user IDs, and a connecting edge between two nodes in the payment relationship network graph represents the existence of a payment interaction event between two corresponding user IDs.

In an embodiment, the dense subgraph acquiring module 904 is further configured to: acquire the preset threshold; and remove from the network graph a node of which the degree of association is less than or equal to the preset threshold and a connecting edge where the node is located, and obtain the dense subgraph according to the remaining nodes in the network graph and the connecting edges between the remaining nodes.

In an embodiment, the first determining module 906 is further configured to: obtain the degree of association of each node in the dense subgraph according to the number of neighbor nodes of each node in the dense subgraph, and take the degree of association in the dense subgraph as initial current coreness of the corresponding node; iteratively calculate, for each node in the dense subgraph, a core index corresponding to the node according to current coreness of the neighbor nodes of the node in the dense subgraph; remove the node from the dense subgraph when the core index is less than or equal to the preset threshold; iteratively execute an operation of updating the current coreness of the node according to the core index of the node when the core index is greater than the preset threshold and less than the current coreness of the node, and stop iteration until the current coreness of each node in the dense subgraph is not updated in a current iteration process; and take nodes in the dense subgraph obtained in response to stopping iteration as the stable nodes, and take the current coreness of the stable nodes in response to stopping iteration as the coreness corresponding to the stable nodes.

In an embodiment, the first determining module 906 is further configured to: record, at the end of the current iteration, the node of which the current coreness is updated in the current iteration process, the recorded node being used for indicating that at the beginning of the next iteration, neighbor nodes of the recorded node in the dense subgraph are taken as target nodes of which the core indexes need to be recalculated in the next iteration process; and calculate, for the target nodes in the dense subgraph, core indexes corresponding to the target nodes according to current coreness of the neighbor nodes of the target nodes in the dense subgraph.

In an embodiment, the first determining module 906 is further configured to: when the node satisfies that the current coreness of h neighbor nodes in the neighbor nodes is greater than or equal to h, and does not satisfy that the current coreness of h+1 neighbor nodes is greater than or equal to h+1, determine that the core index corresponding to the node is h, where h is a positive integer.

In an embodiment, the first determining module 906 is further configured to: initialize, at the beginning of the current iteration process, the number of node updates to zero, the number of node updates being used for recording the number of nodes of which the current coreness is updated in the current iteration process; count the number of nodes of which the current coreness is updated in the current iteration process; update the number of node updates according to the number; continue the next iteration process when the number of node updates is non-zero at the end of the current iteration process; and stop iteration when the number of node updates is zero at the end of the current iteration process.

In an embodiment, the sparse subgraph acquiring module 908 is further configured to: remove the stable nodes from the network graph; and obtain the sparse subgraph according to the remaining nodes after removing the stable nodes and the connecting edges between the remaining nodes.

In an embodiment, the second determining module 910 is further configured to: record, at the end of the current iteration, the node of which the current coreness is updated in the current iteration process; the recorded node being used for indicating that at the beginning of the next iteration, neighbor nodes of the recorded node in the sparse subgraph are taken as target nodes of which the core indexes need to be recalculated in the next iteration process; and calculate, for the target nodes in the sparse subgraph, core indexes corresponding to the target nodes according to current coreness of the neighbor nodes of the target nodes in the network graph.

In an embodiment, the second determining module 910 is further configured to: when the node satisfies that the current coreness of h neighbor nodes in the neighbor nodes is greater than or equal to h, and does not satisfy that the current coreness of h+1 neighbor nodes is greater than or equal to h+1, determine that the core index corresponding to the node is h, where h is a positive integer.

In an embodiment, the second determining module 910 is further configured to: initialize, at the beginning of the current iteration process, the number of node updates to zero, the number of node updates being used for recording the number of nodes of which the current coreness is updated in the current iteration process; count the number of nodes of which the current coreness is updated in the current iteration process; update the number of node updates according to the number; continue the next iteration process when the number of node updates is non-zero at the end of the current iteration process; and stop iteration when the number of node updates is zero at the end of the current iteration process.

In an embodiment, the network graph is a payment relationship network graph, nodes in the payment relationship network graph represent user IDs, and a connecting edge between two nodes in the payment relationship network graph represents the existence of a payment interaction event between two corresponding user Ids. The apparatus further includes a classifying module, configured to: generate, according to the coreness of each node in the payment relationship network graph, a feature vector corresponding to a user ID represented by the node; and predict, by a pre-trained classification model, a payment type corresponding to the user ID based on the feature vector.

After acquiring the degree of association of each node in the network graph, the above-mentioned graph data processing apparatus performs divide-and-conquer solving on the network graph based on a divide-and-conquer idea, and thus can support subgraph mining of ultra-large-scale networks. That is, according to the degree of association of each node, splitting a complete network graph into a dense subgraph and a sparse subgraph, i.e., splitting it into two parts for mining, greatly reduces the memory consumption, and can directly cut into the dense subgraph, thereby avoiding wasting more iteration time and computing resources on non-critical nodes, and improving the mining performance.

Since each node in the sparse subgraph does not affect the nodes in the dense subgraph, for the dense subgraph, the stable nodes therein and the coreness corresponding to the stable nodes are directly determined, and then the remaining part of the network graph other than the stable nodes and the connecting edges between the stable nodes form the sparse subgraph. Considering that the stable nodes in the dense subgraph affect the nodes in the sparse subgraph, for the sparse subgraph, it is necessary to determine the coreness of each node in the sparse subgraph according to the sparse subgraph itself and the stable nodes in the dense subgraph. After mining the coreness of each node in the network graph, the coreness can be taken as the feature of the corresponding node to generate a corresponding feature vector to be inputted to other downstream tasks.

For a specific limitation on the graph data processing apparatus, refer to the limitation on the foregoing graph data processing method. Details are not described herein again. All or some of the modules included in the foregoing graph data processing apparatus may be implemented by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 10. The computer device includes a processor, a memory, and a network interface that are connected by using a system bus. The processor of the computer device is configured to provide computing and control capabilities. The memory of the computer device includes a non-transitory storage medium and an internal memory. The non-transitory storage medium stores an operating system and computer-readable instructions. The internal memory provides an environment for running of the operating system and the computer-readable instructions in the non-transitory storage medium. The network interface of the computer device is configured to communicate with an external terminal through a network connection. The computer-readable instructions are executed by the processor to implement a graph data processing method.

Figure 10:
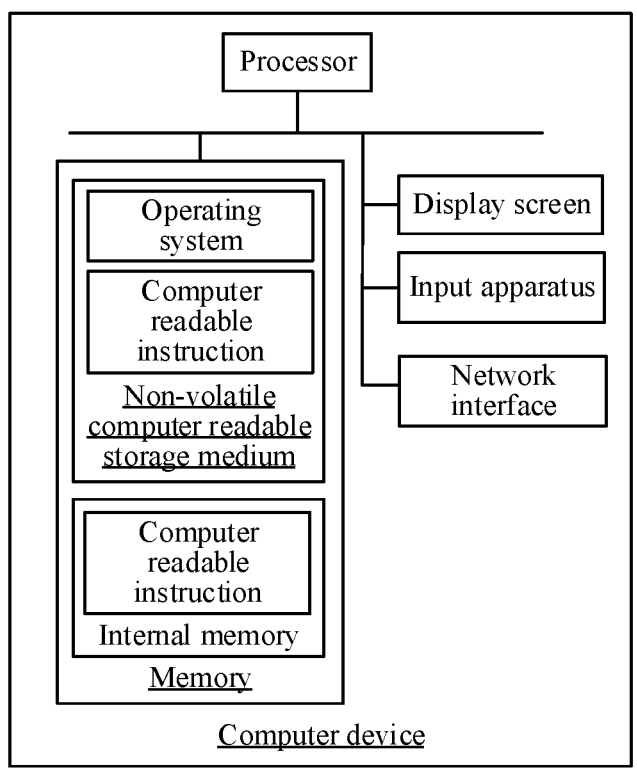
FIG. 10 is a diagram of an internal structure of a computer device according to an embodiment.

A person skilled in the art may understand that, the structure shown in FIG. 10 is only a block diagram of a part of a structure related to a solution of this application and does not limit the computer device to which the solution of this application is applied. Specifically, the computer device may include more or fewer members than those in the drawings, or include a combination of some members, or include different member layouts.

In an embodiment, a computer device is provided, including a memory and a processor, the memory storing computer-readable instructions, the processor, when executing the computer-readable instructions, implementing the steps in the foregoing method embodiments.

In an embodiment, a computer-readable storage medium is provided, storing computer-readable instructions, the computer-readable instructions, when executed by a processor, implementing the steps in the foregoing method embodiments.

In an embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that all or some of the procedures of the methods of the foregoing embodiments may be implemented by computer-readable instructions instructing relevant hardware. The computer-readable instructions may be stored in a non-transitory computer-readable storage medium. When the computer-readable instructions are executed, the procedures of the embodiments of the foregoing methods may be included. Any reference to a memory, a storage, a database, or another medium used in the embodiments provided in this application may include at least one of a non-transitory memory and a volatile memory. The non-transitory memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of this application, and their description is relatively specific and detailed, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of this application shall be subject to the protection scope of the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A graph data processing method performed by a computer device, and the method comprising:
    acquiring a degree of association of each node in a network graph;
    splitting the network graph to obtain a dense subgraph according to a preset threshold and the degree of association of each node;
    determining stable nodes in the network graph and coreness of the stable nodes based on the dense subgraph, the coreness of the stable nodes being greater than the preset threshold;
    obtaining a sparse subgraph in the network graph according to remaining nodes in the network graph other than the stable nodes and connecting edges between the remaining nodes; and
    determining the coreness of each node in the sparse subgraph based on the sparse subgraph and the stable nodes;
    the determined coreness being used for generating a feature vector corresponding to a corresponding node.

2. The method according to claim 1, wherein the acquiring a degree of association of each node in a network graph comprises:
    acquiring the network graph;
    determining the number of neighbor nodes of each node in the network graph; and
    taking the number of the neighbor nodes as the degree of association of the corresponding node.

3. The method according to claim 1, wherein the method further comprises:
    acquiring payment records corresponding to user IDs;
    obtaining payment interaction data between the user IDs according to the payment records; and
    generating a payment relationship network graph according to the payment interaction data;

wherein nodes of the payment relationship network graph represent the user IDs, and a connecting edge between two nodes in the payment relationship network graph represents the existence of a payment interaction event between two corresponding user IDs.

4. The method according to claim 1, wherein the splitting the network graph to obtain a dense subgraph according to a preset threshold and the degree of association of each node comprises:
acquiring the preset threshold; and
removing from the network graph a node of which the degree of association is less than or equal to the preset threshold and a connecting edge where the node is located, and obtaining the dense subgraph according to the remaining nodes in the network graph and the connecting edges between the remaining nodes.

5. The method according to claim 1, wherein the determining stable nodes in the network graph and coreness of the stable nodes based on the dense subgraph comprises:
obtaining the degree of association of each node in the dense subgraph according to the number of neighbor nodes of each node in the dense subgraph, and taking the degree of association in the dense subgraph as initial current coreness of the corresponding node;
iteratively calculating, for each node in the dense subgraph, a core index corresponding to the node according to current coreness of the neighbor nodes of the node in the dense subgraph; removing the node from the dense subgraph when the core index is less than or equal to the preset threshold; iteratively executing an operation of updating the current coreness of the node according to the core index of the node when the core index is greater than the preset threshold and less than the current coreness of the node, and stopping iteration until the current coreness of each node in the dense subgraph is not updated in a current iteration process; and
taking nodes in the dense subgraph obtained in response to stopping iteration as the stable nodes, and taking the current coreness of the stable nodes in response to stopping iteration as the coreness corresponding to the stable nodes.

6. The method according to claim 5, wherein the method further comprises:
recording, at the end of the current iteration, the node of which the current coreness is updated in the current iteration process;
the recorded node is used for indicating that at the beginning of the next iteration, neighbor nodes of the recorded node in the dense subgraph are taken as target nodes of which the core indexes need to be recalculated in the next iteration process; and
the calculating, for each node in the dense subgraph, a core index corresponding to the node according to current coreness of the neighbor nodes of the node in the dense subgraph comprises:
calculating, for the target nodes in the dense subgraph, core indexes corresponding to the target nodes according to current coreness of the neighbor nodes of the target nodes in the dense subgraph.

7. The method according to claim 1, wherein the obtaining a sparse subgraph in the network graph according to remaining nodes in the network graph other than the stable nodes and connecting edges between the remaining nodes comprises:
removing the stable nodes from the network graph; and
obtaining the sparse subgraph according to the remaining nodes after removing the stable nodes and the connecting edges between the remaining nodes.

8. The method according to claim 1, wherein the determining the coreness of each node in the sparse subgraph based on the sparse subgraph and the stable nodes comprises:
initializing current coreness of each node in the sparse subgraph according to the number of neighbor nodes, in the original network graph, of each node in the sparse subgraph;
iteratively calculating, for each node in the sparse subgraph, a core index corresponding to the node according to current coreness of the neighbor nodes of the node in the network graph; updating the current coreness of the node according to the core index of the node when the core index is less than the current coreness of the node, and stopping iteration until the current coreness of each node in the sparse subgraph is not updated in a current iteration process; and
taking the current coreness of the node in response to stopping iteration as the coreness corresponding to the node.

9. The method according to claim 8, wherein the method further comprises:
recording, at the end of the current iteration, the node of which the current coreness is updated in the current iteration process;
the recorded node is used for indicating that at the beginning of the next iteration, neighbor nodes of the recorded node in the sparse subgraph are taken as target nodes of which the core indexes need to be recalculated in the next iteration process; and
the calculating, for each node in the sparse subgraph, a core index corresponding to the node according to current coreness of the neighbor nodes of the node in the network graph comprises:
calculating, for the target nodes in the sparse subgraph, core indexes corresponding to the target nodes according to current coreness of the neighbor nodes of the target nodes in the network graph.

10. The method according to claim 5, wherein the calculating a core index corresponding to the node comprises:
when the node satisfies that the current coreness of h neighbor nodes in the neighbor nodes is greater than or equal to h, and does not satisfy that the current coreness of h+1 neighbor nodes is greater than or equal to h+1, determining that the core index corresponding to the node is h, wherein h is a positive integer.

11. The method according to claim 5, wherein the method further comprises:
initializing, at the beginning of the current iteration process, the number of node updates to zero, the number of node updates being used for recording the number of nodes of which the current coreness is updated in the current iteration process;
counting the number of nodes of which the current coreness is updated in the current iteration process;
updating the number of node updates according to the number;
continuing the next iteration process when the number of node updates is non-zero at the end of the current iteration process; and
stopping iteration when the number of node updates is zero at the end of the current iteration process.

12. The method according to claim 1, wherein the network graph is a payment relationship network graph, nodes in the payment relationship network graph represent user IDs, and a connecting edge between two nodes in the payment relationship network graph represents the existence of a payment interaction event between two corresponding user IDs; the method further comprises:

generating, according to the coreness of each node in the payment relationship network graph, a feature vector corresponding to a user ID represented by the node; and predicting, by a pre-trained classification model, a payment type corresponding to the user ID based on the feature vector.

13. A computer device, comprising a memory and one or more processors, the memory storing computer-readable instructions that, when executed by the one or more processors, cause the computer device to perform a graph data processing method including:

acquiring a degree of association of each node in a network graph;

splitting the network graph to obtain a dense subgraph according to a preset threshold and the degree of association of each node;

determining stable nodes in the network graph and coreness of the stable nodes based on the dense subgraph, the coreness of the stable nodes being greater than the preset threshold;

obtaining a sparse subgraph in the network graph according to remaining nodes in the network graph other than the stable nodes and connecting edges between the remaining nodes; and determining the coreness of each node in the sparse subgraph based on the sparse subgraph and the stable nodes;

the determined coreness being used for generating a feature vector corresponding to a corresponding node.

14. The computer device according to claim 13, wherein the acquiring a degree of association of each node in a network graph comprises:

acquiring the network graph;

determining the number of neighbor nodes of each node in the network graph; and taking the number of the neighbor nodes as the degree of association of the corresponding node.

15. The computer device according to claim 13, wherein the method further comprises:

acquiring payment records corresponding to user IDs;

obtaining payment interaction data between the user IDs according to the payment records; and generating a payment relationship network graph according to the payment interaction data;

wherein nodes of the payment relationship network graph represent the user IDs, and a connecting edge between two nodes in the payment relationship network graph represents the existence of a payment interaction event between two corresponding user IDs.

16. The computer device according to claim 13, wherein the splitting the network graph to obtain a dense subgraph according to a preset threshold and the degree of association of each node comprises:

acquiring the preset threshold; and removing from the network graph a node of which the degree of association is less than or equal to the preset threshold and a connecting edge where the node is located, and obtaining the dense subgraph according to the remaining nodes in the network graph and the connecting edges between the remaining nodes.

17. The computer device according to claim 13, wherein the determining stable nodes in the network graph and coreness of the stable nodes based on the dense subgraph comprises:

obtaining the degree of association of each node in the dense subgraph according to the number of neighbor nodes of each node in the dense subgraph, and taking the degree of association in the dense subgraph as initial current coreness of the corresponding node;

iteratively calculating, for each node in the dense subgraph, a core index corresponding to the node according to current coreness of the neighbor nodes of the node in the dense subgraph; removing the node from the dense subgraph when the core index is less than or equal to the preset threshold; iteratively executing an operation of updating the current coreness of the node according to the core index of the node when the core index is greater than the preset threshold and less than the current coreness of the node, and stopping iteration until the current coreness of each node in the dense subgraph is not updated in a current iteration process; and taking nodes in the dense subgraph obtained in response to stopping iteration as the stable nodes, and taking the current coreness of the stable nodes in response to stopping iteration as the coreness corresponding to the stable nodes.

18. The computer device according to claim 13, wherein the obtaining a sparse subgraph in the network graph according to remaining nodes in the network graph other than the stable nodes and connecting edges between the remaining nodes comprises:

removing the stable nodes from the network graph; and obtaining the sparse subgraph according to the remaining nodes after removing the stable nodes and the connecting edges between the remaining nodes.

19. The computer device according to claim 13, wherein the network graph is a payment relationship network graph, nodes in the payment relationship network graph represent user IDs, and a connecting edge between two nodes in the payment relationship network graph represents the existence of a payment interaction event between two corresponding user IDs; the method further comprises:

generating, according to the coreness of each node in the payment relationship network graph, a feature vector corresponding to a user ID represented by the node; and predicting, by a pre-trained classification model, a payment type corresponding to the user ID based on the feature vector.

20. One or more non-transitory computer-readable storage media storing computer-readable instructions that, when executed by one or more processors of a computer device, cause the computer device to perform a graph data processing method including:

acquiring a degree of association of each node in a network graph;

splitting the network graph to obtain a dense subgraph according to a preset threshold and the degree of association of each node;

determining stable nodes in the network graph and coreness of the stable nodes based on the dense subgraph, the coreness of the stable nodes being greater than the preset threshold;

obtaining a sparse subgraph in the network graph according to remaining nodes in the network graph other than the stable nodes and connecting edges between the remaining nodes; and determining the coreness of each node in the sparse subgraph based on the sparse subgraph and the stable nodes;

the determined coreness being used for generating a feature vector corresponding to a corresponding node.

* * * * *